US007394299B2

(12) United States Patent
Wadhwa et al.

(10) Patent No.: US 7,394,299 B2
(45) Date of Patent: Jul. 1, 2008

(54) DIGITAL CLOCK FREQUENCY MULTIPLIER

(75) Inventors: Sanjay K. Wadhwa, Saharanpur (IN); Deeya Muhury, Ranchi (IN); Pawan K. Tiwari, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 94 days.

(21) Appl. No.: 11/538,304

(22) Filed: Oct. 3, 2006

(65) Prior Publication Data

US 2007/0080724 A1 Apr. 12, 2007

(30) Foreign Application Priority Data

Oct. 6, 2005 (IN) ........................ 2689/DEL/2005

(51) Int. Cl.
*H03B 19/00* (2006.01)

(52) U.S. Cl. .......................... 327/116; 327/119; 377/47

(58) Field of Classification Search ................. 327/113, 327/114, 116, 119–123, 355–358; 377/47, 377/48

See application file for complete search history.

(56) References Cited

U.S. PATENT DOCUMENTS

| | | | | |
|---|---|---|---|---|
| 3,673,391 | A | 6/1972 | Lougheed | |
| 4,025,866 | A | 5/1977 | Fletcher et al. | |
| 4,244,027 | A | 1/1981 | Shai | |
| 4,339,722 | A | 7/1982 | Sydor et al. | |
| 6,788,120 | B1 * | 9/2004 | Nguyen | 327/172 |
| 6,876,236 | B2 * | 4/2005 | Aman | 327/121 |
| 6,906,562 | B1 * | 6/2005 | Nguyen | 327/116 |
| 7,132,863 | B2 * | 11/2006 | Wadhwa et al. | 327/116 |
| 7,236,557 | B1 * | 6/2007 | Nguyen | 377/47 |

* cited by examiner

*Primary Examiner*—N. Drew Richards
*Assistant Examiner*—Patrick O'Neill
(74) *Attorney, Agent, or Firm*—Charles Bergere

(57) ABSTRACT

A digital clock frequency multiplier (100) for increasing an input frequency of an input clock signal includes a generator (102) that receives the input clock signal and a high frequency digital signal. The generator (102) divides a count ($N_{hf}$) of a number of cycles of the high frequency digital signal in one period of the input clock signal by a predetermined multiplication factor (MF) for generating an output clock signal. The output clock signal has a predetermined output frequency.

15 Claims, 3 Drawing Sheets

DIGITAL CLOCK FREQUENCY MULTIPLIER

BACKGROUND OF THE INVENTION

The present invention relates generally to a frequency generator for generating a digital signal and, in particular, to a digital clock frequency multiplier that increases the frequency of an input clock signal.

Clock frequency multipliers are widely used in integrated circuits. Conventionally, phase locked loops (PLLs) are used as clock frequency multipliers to increase the frequency of an input clock signal. However, PLLs require much time and design effort to ensure stability, consume large silicon area and often require external components for usage, resulting in increased costs. Additionally, because PLLs have high lock times, the frequency of the input clock signal cannot be changed quickly. Further, PLLs are only suited for handling input clock signals of limited frequency and duty cycle ranges, and individual PLLs have limited multiplication ranges.

In view of the foregoing, it would be desirable to have an inexpensive programmable digital clock frequency multiplier that has low lock time, a wide multiplication range and that is suited for handling a wide range of input frequencies and duty cycles.

BRIEF DESCRIPTION OF THE DRAWINGS

The following detailed description of preferred embodiments of the invention will be better understood when read in conjunction with the appended drawings. The present invention is illustrated by way of example and is not limited by the accompanying figures, in which like references indicate similar elements.

DETAILED DESCRIPTION OF THE INVENTION

Figure 1:
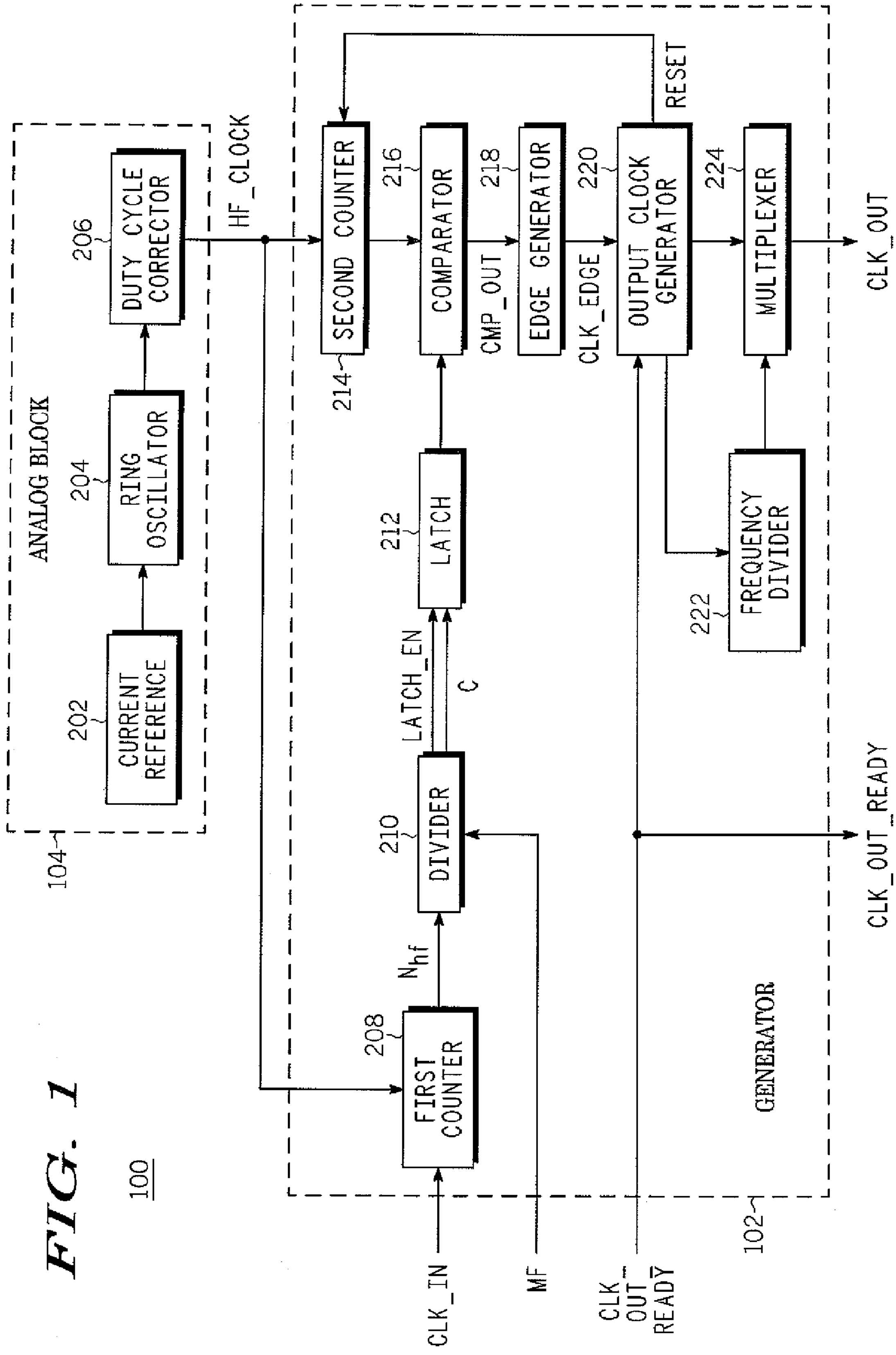
FIG. 1 is a schematic block diagram of a digital clock frequency multiplier in accordance with an embodiment of the present invention.

The detailed description set forth below in connection with the appended drawings is intended as a description of the presently preferred embodiments of the invention, and is not intended to represent the only form in which the present invention may be practiced. It is to be understood that the same or equivalent functions may be accomplished by different embodiments that are intended to be encompassed within the spirit and scope of the invention.

The present invention is a digital clock frequency multiplier for increasing an input frequency of an input clock signal. The digital clock frequency multiplier includes a generator that receives the input clock signal and a high frequency digital signal. The generator divides a count ($N_{hf}$) of a number of cycles of the high frequency digital signal in one period of the input clock signal by a predetermined multiplication factor (MF) for generating an output clock signal. The output clock signal has a predetermined output frequency.

In one embodiment of the present invention, the generator includes a first counter, a divider, a first latch, a second counter, a comparator, an edge generator, and an output clock generator. The first counter receives the input clock signal and the high frequency digital signal, and generates the count $N_{hf}$. The divider coupled to the first counter divides the count $N_{hf}$ by the predetermined multiplication factor MF to determine a number of cycles (C) of the high frequency digital signal in one period of the output clock signal. The first latch is coupled to the divider and stores predetermined values of the number of cycles C. The second counter receives the high frequency digital signal and counts the cycles thereof. The comparator, coupled to the first latch and the second counter, compares the counted cycles from the second counter with the predetermined values of the number of cycles C stored in the first latch. The edge generator, which is coupled to the comparator, generates pulse signals when the counted cycles from the second counter are equal to the predetermined values of the number of cycles C stored in the first latch. The output clock generator, which is coupled to the edge generator, receives the pulse signals and generates the output clock signal therefrom.

In another embodiment of the present invention, a method for generating an output clock signal is provided. The method includes receiving an input clock signal and a high frequency digital signal and generating a count ($N_{hf}$) of a number of cycles of the high frequency digital signal in one period of the input clock signal. The count $N_{hf}$ is divided by a predetermined multiplication factor (MF) to determine a number of cycles (C) of the high frequency digital signal in one period of the output clock signal. An edge is generated for each cycle C. The generated edges are combined to generate the output clock signal. The output clock signal has a predetermined output frequency.

The digital clock frequency multiplier may be implemented in the form of an integrated circuit or part of an integrated circuit. The implementation does not require external components. Further, only a small area of silicon is required for the implementation. Having an open-looped architecture, the digital clock frequency multiplier is inherently stable and does not require much time and design effort to ensure stability. The digital clock frequency multiplier can be used with an input clock signal of any duty cycle varying from 10-90%. Further, the digital clock frequency multiplier has a low lock time of about twelve (12) cycles of an input clock signal. Therefore, the frequency of the input clock signal can be changed quickly. The digital clock frequency multiplier generates an output clock signal with low frequency error and jitter. Additionally, the digital clock frequency multiplier supports a wide multiplication range and can be implemented in all CMOS process technologies.

Referring now to FIG. 1, a block diagram of a digital clock frequency multiplier 100 in accordance with an embodiment of the present invention is shown. The digital clock frequency multiplier 100 includes a generator 102 and an analog block 104. An input clock signal 'clk_in' with a time period $T_{clk\_in}$ is input to the generator 102. The generator 102 receives the input clock signal clk_in and a high frequency digital signal 'hf_clk' generated by the analog block 104, and divides a count ($N_{hf}$) of the number of cycles of the high frequency digital signal hf_clk in one period $T_{clk\_in}$ of the input clock signal clk_in by a predetermined multiplication factor (MF) to generate an output clock signal 'clk_out' having a predetermined output frequency $f_{out}$. The predetermined output frequency $f_{out}$ is substantially equal to the product of the predetermined multiplication factor MF and the frequency $f_{in}$ of the input clock signal clk_in The predetermined output frequency $f_{out}$ can be expressed as follows:

$$f_{out} = MF \times \frac{1}{T_{\text{clk\_in}}} \quad (1)$$

$$f_{out} = MF \times f_{in}. \quad (2)$$

The analog block 104 includes a current reference circuit 202, a ring oscillator 204, and a duty cycle corrector 206. The current reference circuit 202 generates a signal with a stable current that is provided as an input to the ring oscillator 204. The ring oscillator 204 generates the high frequency digital signal with a time period $T_{hf\_clk}$. In one embodiment of the invention, the ring oscillator 204 comprises a current controlled oscillator (CCO) having three inverter stages. A CCO is used because it has good power supply rejection as compared to a normal ring oscillator. In an embodiment of the present invention, the frequency of the high frequency digital signal is greater than a predetermined threshold. The predetermined threshold is based on frequency error in the output clock signal clk_out. In general, the higher the frequency of the high frequency digital signal, the lesser will be the frequency error in output clock signal clk_out. In one embodiment of the present invention, the frequency of the high frequency digital signal is about one gigahertz. The high frequency digital signal is not required to have a fifty (50) percent duty cycle. Further, its output voltage swing need not be rail-to-rail. The duty cycle corrector 206 is coupled to the ring oscillator 204 and receives the high frequency digital signal. The duty cycle corrector 206 adjusts the duty cycle of the high frequency digital signal to approximately 50 percent (+/− about 5%) and makes the output voltage swing rail-to-rail. The modified high frequency digital signal 'hf_clk' is then output from the analog block 104 and input to the generator 102. Although, the ring oscillator 204 is used for generating the high frequency digital signal in this embodiment, other sources such as, but not limited to, an LC oscillator and a phase locked loop (PLL) can be used as per the availability on the chip for generating the high frequency digital signal.

The generator 102 includes a first counter 208, a divider 210, a first latch 212, a second counter 214, a comparator 216, an edge generator 218, an output clock generator 220, a frequency divider 222, and a multiplexer 224. The high frequency digital signal hf_clk is provided to the first counter 208 and the second counter 214.

The first counter 208 receives the input clock signal clk_in and the high frequency digital signal hf_clk, and generates the count $N_{hf}$. More particularly, the first counter 208 counts the number of pulses of the high frequency digital signal hf_clk in one clock cycle or period $T_{clk\_in}$ of the input clock signal clk_in. In other words, the first counter 208 measures $T_{clk\_in}$ in terms of $T_{hf\_clk}$. The count $N_{hf}$ can be expressed as follows:

$$N_{hf} = \frac{T_{\text{clk\_in}}}{T_{\text{hf\_clk}}}. \quad (3)$$

The count $N_{hf}$ is latched in the first counter 208 with a second latch (not shown) and periodically updated at predetermined intervals in one clock cycle of the input clock signal clk_in. The predetermined intervals are based on voltage and temperature (VT) variations. In other words, the count $N_{hf}$ is updated for changes that may occur in the frequency of the high frequency clock signal hf_clk due to VT variations. Because the frequency of the input clock signal clk_in is repetitively sampled, the predetermined output frequency $f_{out}$ does not vary much with VT variations. In an exemplary embodiment of the present invention, the duration of the predetermined intervals after which the count $N_{hf}$ is updated is about twelve (12). Nevertheless, it will be apparent to one skilled in the art that the duration of the predetermined intervals can be longer or shorter depending on the VT variations. For example, if there is frequent variation in VT, the duration of each interval is shorter so that the count $N_{hf}$ is updated more frequently. However, if VT variations are infrequent, then the duration of each interval is longer and consequently the count $N_{hf}$ is updated less frequently.

The divider 210 is coupled to the first counter 208 and receives the count $N_{hf}$ and divides the count $N_{hf}$ latched by the predetermined multiplication factor MF to determine the number of cycles (C) of the high frequency digital signal hf_clk in one period of the output clock signal clk_out. Division of the count $N_{hf}$ by the predetermined multiplication factor MF determines the intervals at which output edges are generated. In this particular embodiment, the divider 210 is a 10-bit divider. The predetermined multiplication factor MF has values ranging from 128 to 1023. Consequently, the digital clock frequency multiplier 100 has a wide multiplication range from about 128 to about 1023 times the input frequency $f_{in}$. The multiplication range of the digital clock frequency multiplier 100 may be increased through the use of post-dividers. In an embodiment of the present invention, the number of cycles C is determined by dividing the count $N_{hf}$ by two (2) times the predetermined multiplication factor MF, that is, 2MF, when the predetermined multiplication factor MF is less than a predetermined threshold value. In this particular embodiment, the predetermined threshold value is 256 in order to restrict the length of the second counter 214 to eight bits due to timing concerns. The second counter 214 is a synchronous counter, which is difficult to run at greater than eight bit at one gigahertz. In order to reduce the length of the second counter 214 to eight (8) bits, first, minimum MF has been limited to 128, and second, for MF>128 and <256 (128<MF <256), 2MF is used to divide $N_{hf}$ in divider 210, which allows the divide value achieved to be half and can be counted by an eight bit counter operating at one gigahertz. The use of 2MF results in double the desired output frequency. Therefore, a divide by 2 stage, frequency divider 222 is used at the output to achieve the desired frequency. Accordingly, the number of cycles C, in this particular embodiment, can be expressed as follows:

$$C = \frac{N_{hf}}{MF \times 2}; \text{ where } MF < 256 \quad (4)$$

$$C = \frac{N_{hf}}{MF}; \text{ where } MF \geq 256. \quad (5)$$

To reduce error in the output frequency $f_{out}$, the number of cycles C is incremented by one when a value of the remainder (R) from the division performed by the divider 210 is greater than one-half. The multiplication range of the digital frequency multiplier 100 can be increased, i.e., from 2 to 1023 using the above technique. The multiplication factor is limited by the length of the second counter 214, which can count up to 256. So, for any value of multiplication factor less than 256, $N_{hf}$ can be divided by NUM*MF such that NUM*MF>=256 (NUM=$2^x$) and then do a post divide by the same factor NUM to get the desired output frequency. For MF>=128, a divide by 2 has been implemented. For MF<128, i.e., from 2 to 127, an additional post-divider can be used at the output to obtain the desired frequency. For example, if frequency multiplication by 2 is desired, then MF will be fed as $2^7$ *2=256 and at the output, a divide by 128 will be used to get the desired frequency 2*$f_{in}$. Similarly, if frequency multiplication by 61 is desired, then MF will be fed as $2^2$*61=264 and at the output, a divide by 4 will be used to get the desired frequency 61*$f_{in}$. In this manner, any multiplication factor between 2 and 127 can be obtained.

On determining the number of cycles C, the divider 210 enables the first latch 212, which is coupled thereto, with a signal latch_en. The first latch 212 stores predetermined values of the number of cycles C. In this particular embodiment, the first latch 212 stores values equal to the number of cycles C and half the number of cycles C/2.

The second counter 214 receives the high frequency digital signal hf_clk from the analog block 104 and counts the number of clock cycles thereof.

The comparator 216 is coupled to the second counter 214 and the first latch 212, and compares the counted cycles from the second counter 218 with the predetermined values of the number of cycles C stored in the first latch 212, and generates a signal cmp_out, which is provided to the edge generator 218.

The edge generator 218 is coupled to the comparator 216 and receives the signal cmp_out and generates pulse signals when the counted cycles from the second counter 214 are equal to the predetermined values of the number of cycles C stored in the first latch 212. In this particular embodiment, the edge generator 218 generates a pulse signal each time the number of counted cycles from the second counter 214 is equal to C/2 and C, which are the predetermined values of the number of cycles C stored in the first latch 212. In other words, edges 'clk_edge' are generated when the number of counted cycles from the second counter 214 equals C/2 and C. Accordingly, two pulse signals corresponding to C/2 and C, respectively, are generated by the edge generator 218. Each pulse signal has a period equal to one cycle of the high frequency digital signal hf_clk. The pulse signals are provided as an input to the output clock generator 220.

The output clock generator 220 is coupled to the edge generator 218, receives the pulse signals, and generates the output clock signal clk_out therefrom. Specifically, the output clock generator 220 combines the pulse signals or edges generated by the edge generator 218 with an AND logic function to generate the output clock signal clk_out. On receiving the pulse signal corresponding to the number of cycles C, the output clock generator 220 sends a reset signal 'reset' to reset the second counter 214, which then starts counting from zero (0) again. The output clock generator 220 is triggered by a clk_out_ready signal, which is generated after a predetermined number of input clock cycles, taking into account the startup time of the current reference 202 and the duty cycle corrector 206. The output clock generator 220 generates the output clock signal clk_out when the clk_out_ready signal goes ON. The output clock signal clk_out continues to occur for the ON time of the clk_out_ready signal.

In an embodiment of the present invention, the output clock signal clk_out from the output clock generator 220 is provided as an input to the frequency divider 222 and as a first input to the multiplexer 224. The frequency divider 222 is coupled to the output clock generator 220, receives the output clock signal clk_out, and divides the output frequency of the output clock signal clk_out by two. The output clock signal clk_out with a halved frequency is then provided as a second input to the multiplexer 224. The multiplexer 224 is coupled to the output clock generator 220 and the frequency divider 222, and receives the first and second inputs, and selects the output clock signal clk_out having the predetermined output frequency $f_{out}$ based on the predetermined multiplication factor MF. In particular, the multiplexer 224 selects the input from the frequency divider 222 when the predetermined multiplication factor MF is less than the predetermined threshold value, while that from the output clock generator 220 is selected when the predetermined multiplication factor MF is greater than or equal to the predetermined threshold value. The selected input signal is produced as an output signal by the multiplexer 224.

The foregoing process is repeated every clock cycle of the input clock signal clk_in for generating the output clock signal clk_out. In one embodiment of the invention, the second counter 214 uses a pre-scalar technique to run at high frequency. The pre-scalar stage has a 2-bit length and the second stage has a 6-bit length and runs at high frequency digital signal hf_clk (about 1 gigahertz) frequency.

It will be appreciated by those skilled in the art that the digital clock frequency multiplier 100 is capable of altering the duty cycle of the input clock signal clk_in by storing count values corresponding to a desired duty cycle. Edges corresponding to the count values are then generated. These edges are combined to generate an output clock signal clk_out with the desired duty cycle. For example, in the current embodiment, the output clock signal clk_out has a nearly fifty (50) percent duty cycle as the edges are generated at equal intervals after every C/2 count value.

Figure 2:
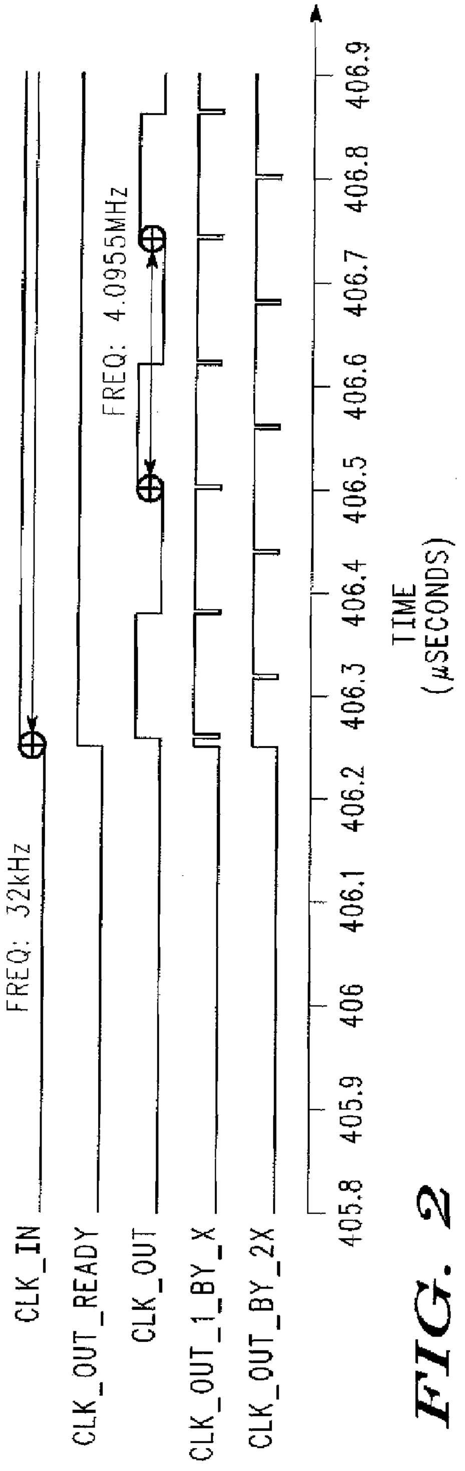
FIG. 2 is a waveform diagram illustrating the timing behavior of an output clock signal of the digital clock frequency multiplier shown in FIG. 1.

Referring now to FIG. 2, a timing diagram showing an output clock signal clk_out in accordance with the clock frequency multiplier 100 in FIG. 1 is shown. In FIG. 2, the input clock signal clk_in has an input frequency $f_{clk\_in}$ of 32 kilohertz (kHz) and is multiplied by a predetermined multiplication factor MF of 128. The output clock signal clk_out is generated by combining the edges at C/2 and C of waveforms clk_out__1_by__2x and clk_out__1_by_x, respectively. The output clock signal clk_out has an output frequency $f_{out}$ of 4.0955 megahertz (MHz), which is about 128 times the input frequency $f_{clk\_in}$. As can be seen, the output clock signal clk_out is generated when the clk_out_ready signal goes ON and continues to occur for the ON time of the clk_out_ready signal.

Figure 3:
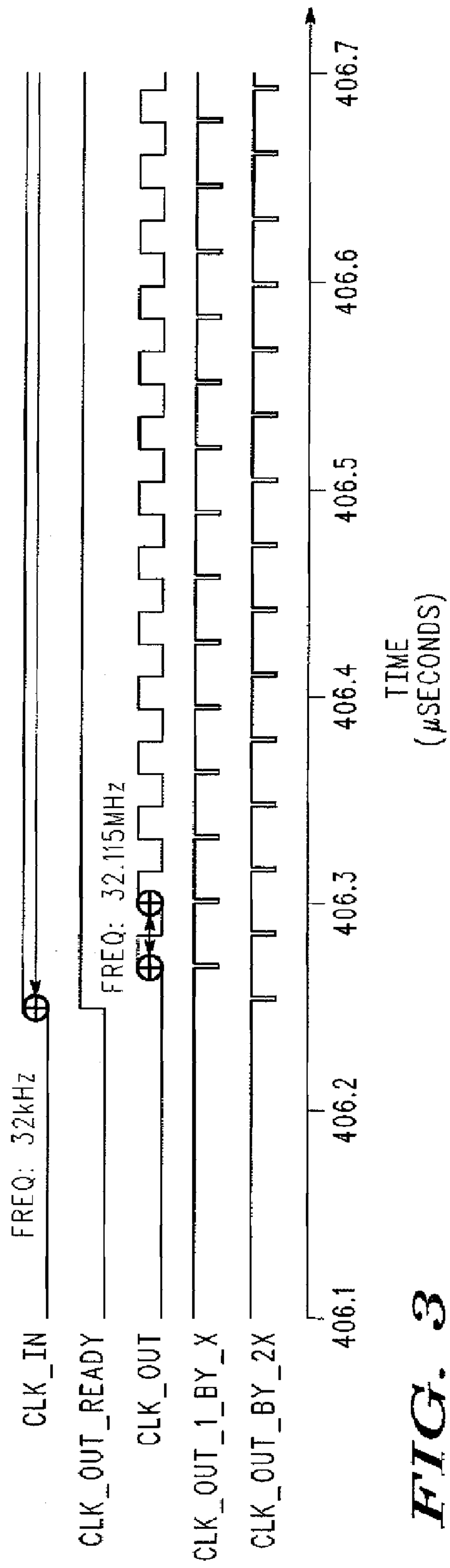
FIG. 3 is another waveform diagram illustrating the timing behavior of an output clock signal of the digital clock frequency multiplier shown in FIG. 1.

Referring now to FIG. 3, another timing diagram showing an output clock signal clk_out in accordance with the clock frequency multiplier 100 in FIG. 1 is shown. In FIG. 3, the input clock signal clk_in has an input frequency $f_{clk\_in}$ of 32 kHz and is multiplied by a predetermined multiplication factor MF of 1023. The output clock signal clk_out is generated by combining the edges at C/2 and C of waveforms clk_out__1_by__2x and clk_out__1_by_x, respectively. The output clock signal clk_out has an output frequency $f_{out}$ of 32.115 MHz, which is about 1023 times the input frequency $f_{clk\_in}$. As can be seen, the output clock signal clk_out is generated when the clk_out_ready signal goes ON and continues to occur for the ON time of the clk_out_ready signal.

Figure 4:
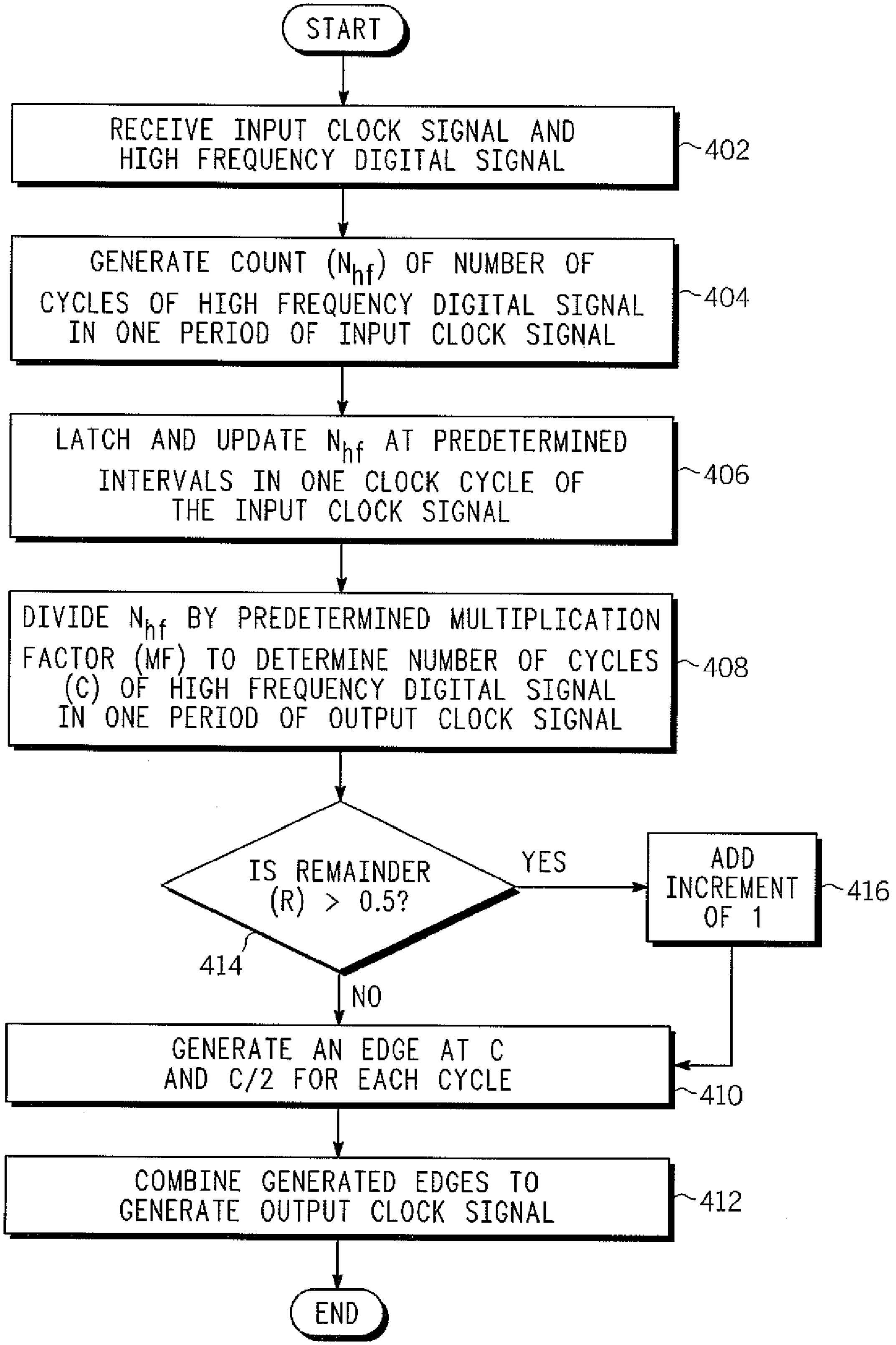
FIG. 4 is a flowchart depicting a method for generating an output clock signal in accordance with the present invention.

Referring now to FIG. 4, a flowchart depicting a method for generating an output clock signal in accordance with the present invention is shown. In this method, an input clock signal clk_in and a high frequency digital signal hf_clk are received at step 402. A count ($N_{hf}$) of the number of cycles of the high frequency digital signal hf_clk in one period of the input clock signal clk_in is generated at step 404. The count $N_{hf}$ may be stored and updated at predetermined intervals in one clock cycle of the input clock signal clk_in in step 406. The count $N_{hf}$ is divided by a predetermined multiplication factor (MF) at step 408 to determine the number of cycles (C) of the high frequency digital signal hf_clk in one period of the output clock signal clk_out. In other words, the count $N_{hf}$ is divided by the predetermined multiplication factor MF to determine the intervals at which output edges are generated. Accordingly, an edge is generated for each cycle C at step 410. The generated edges are combined at step 412 to generate the output clock signal clk_out. The output clock signal clk_out has a predetermined output frequency $f_{out}$ that is substantially equal to the product of the predetermined multiplication factor MF and the frequency $f_{in}$ of the input clock signal clk_in.

To reduce error in the output frequency $f_{out}$, a logic step 414 determines whether the remainder (R) from the division of the count $N_{hf}$ by the predetermined multiplication factor MF at step 408 is greater than one-half. If the remainder R is greater than one-half, an increment of one (1) is added to the number of cycles C at step 416. Otherwise, the remainder R is discarded and an edge is generated at step 410 for each of the cycles C determined at step 408.

While various embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

The invention claimed is:

1. A digital clock frequency multiplier for increasing an input frequency of an input clock signal, the digital clock frequency multiplier comprising:

a generator that receives the input clock signal and a high frequency digital signal and divides a count ($N_{hf}$) of a number of cycles of the high frequency digital signal in one period of the input clock signal by a predetermined multiplication factor (MF) for generating an output clock signal having a predetermined output frequency, wherein the generator includes:

a first counter that receives the input clock signal and the high frequency digital signal and generates the count $N_{hf}$;

a divider coupled to the first counter that divides the count $N_{hf}$ by the predetermined multiplication factor (ME) to determine a number of cycles (C) of the high frequency digital signal in one period of the output clock signal;

a first latch coupled to the divider that stores predetermined values of the number of cycles C;

a second counter that receives the high frequency digital signal and counts the cycles thereof;

a comparator, coupled to the second counter and the first latch, that compares the counted cycles from the second counter with the predetermined values of the number of cycles C stored in the first latch;

an edge generator coupled to the comparator for generating pulse signals when the counted cycles from the second counter are equal to the predetermined values of the number of cycles C stored in the first latch; and an output clock generator coupled to the edge generator for receiving the pulse signals and generating the output clock signal therefrom.

2. The digital clock frequency multiplier of claim 1, wherein the predetermined multiplication factor has a value ranging from about 2 to about 1023.

3. The digital clock frequency multiplier of claim 1, wherein the first latch stores values equal to the number of cycles C and half the number of cycles C/2.

4. The digital clock frequency multiplier of claim 3, wherein the output clock generator combines the pulse signals generated when the counted cycles from the second counter are equal to the number of cycles C and half the number of cycles C/2 to generate the output clock signal.

5. The digital clock frequency multiplier of claim 1, wherein the generator further comprises a frequency divider coupled to the output clock generator for dividing an output frequency of the output clock signal by two.

6. The digital clock frequency multiplier of claim 5, wherein the generator further comprises a multiplexer coupled to the output clock generator and the frequency divider for selecting the output clock signal having the predetermined output frequency based on the predetermined multiplication factor.

7. The digital clock frequency multiplier of claim 1, wherein the divider increments the number of cycles C when a value of a remainder (R) from the division performed by the divider is greater than one-half.

8. The digital clock frequency multiplier of claim 1, herein the count $N_{hf}$ is updated at predetermined intervals in one clock cycle of the input clock signal.

9. The digital clock frequency multiplier of claim 8, wherein the predetermined intervals are based on voltage and temperature (VT) variations.

10. A digital clock frequency multiplier for increasing an input frequency of an input clock signal, the digital clock frequency multiplier comprising:

a generator that receives the input clock signal and a high frequency digital signal and divides a count ($N_{hf}$) of a number of cycles of the high frequency digital signal in one period of the input clock signal by a predetermined multiplication factor (MF) for generating an output clock signal having a predetermined output frequency, wherein the generator includes:

a first counter that receives the input clock signal and the high frequency digital signal and generates the count $N_{hf}$;

a divider coupled to the first counter that divides the count $N_{hf}$ by the predetermined multiplication factor to determine a number of cycles (C) of the high frequency digital signal in one period of the clock signal;

a first latch coupled to the divider that stores predetermined values of the number of cycles C and C/2;

a second counter that receives the high frequency digital signal and counts the cycles thereof;

a comparator coupled to the first latch and the second counter that compares the counted cycles from the second counter with the predetermined values of the number of cycles C stored in the first latch;

an edge generator coupled to the comparator for generating pulse signals when the counted cycles from the second counter are equal to the predetermined values of the number of cycles C and C/2 stored in the first latch; and an output clock generator coupled to the edge generator for receiving the pulse signals and generating the output clock signal therefrom.

11. The digital clock frequency multiplier of claim 10, wherein the predetermined multiplication factor MF has a value ranging from about 2 to about 1023.

12. The digital clock frequency multiplier of claim 10, wherein the count $N_{hf}$ is updated at predetermined intervals in one clock cycle of the input clock signal.

13. A method for generating an output clock signal, the method comprising:

receiving an input clock signal and a high frequency digital signal;

generating a count ($N_{hf}$) of a number of cycles of the high frequency digital signal in one period of the input clock signal;

dividing the count $N_{hf}$ by a predetermined multiplication factor (MF) to determine a number of cycles (C) of the high frequency digital signal in one period of the output clock signal;

generating an edge for each cycle at C and C/2;

combining the generated edges to generate the output clock signal having a predetermined output frequency; and incrementing the number of cycles C when a value of a remainder (R) from the division is greater than half.

14. The method for generating an output clock signal of claim 13, further comprising latching the count $N_{hf}$.

15. The method for generating an output clock signal of claim 14, further comprising updating the count $N_{hf}$ at predetermined intervals in one clock cycle of the input clock signal.

* * * * *

UNITED STATES PATENT AND TRADEMARK OFFICE

CERTIFICATE OF CORRECTION

PATENT NO. : 7,394,299 B2
APPLICATION NO. : 11/538304
DATED : July 1, 2008
INVENTOR(S) : Sanjay Kumar Wadhwa It is certified that error appears in the above-identified patent and that said Letters Patent is hereby corrected as shown below:

In Column 7, Line 41, Claim 1,
Change "(ME)" to --(MF)--

In Column 8, Line 17, Claim 8,
Change "herein" to --wherein--

In Column 8, Line 61, Claim 12,
Change "$N_{hf}$is updated" to --$N_{hf}$ is updated--

In Column 10, Line 6, Claim 15,
Change "$N_{hf}$at predetermined" to --$N_{hf}$ at predetermined--

Signed and Sealed this

Twenty-third Day of November, 2010

David J. Kappos
*Director of the United States Patent and Trademark Office*